US006398108B1

(12) United States Patent
Swinton et al.

(10) Patent No.: US 6,398,108 B1
(45) Date of Patent: Jun. 4, 2002

(54) MACHINE FOR DISPENSING MEDIA

(75) Inventors: James D. Swinton, Dundee; David J. McMillan, Glasgow; William Rice, Dundee; Timothy Wiggins, Perth, all of (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/374,182

(22) Filed: Aug. 13, 1999

Related U.S. Application Data

(63) Continuation-in-part of application No. 09/114,087, filed on Jul. 10, 1998, now abandoned.

(30) Foreign Application Priority Data

Dec. 20, 1997 (GB) ............................................. 9726836

(51) Int. Cl.[7] ................................................ G06F 17/60
(52) U.S. Cl. ........................................................ 235/379
(58) Field of Search ........................... 235/379; 271/12; 209/534

(56) References Cited

U.S. PATENT DOCUMENTS

| | | | | | |
|---|---|---|---|---|---|
| 4,282,424 | A | * | 8/1981 | Hirose | 235/379 |
| 4,320,854 | A | | 3/1982 | Hirose | 221/12 |
| 4,564,122 | A | | 1/1986 | Granzow et al. | 221/12 |
| 4,595,828 | A | | 6/1986 | Lundblad | 235/379 |
| 4,625,870 | A | * | 12/1986 | Nao et al. | 209/534 |
| 4,628,192 | A | | 12/1986 | Suzuki | 235/1 R |
| 4,820,909 | A | | 4/1989 | Kawauchi et al. | 235/379 |
| 5,152,512 | A | | 10/1992 | Yoshida et al. | 271/3.1 |
| 5,295,675 | A | * | 3/1994 | Hain | 271/12 |
| 5,342,165 | A | | 8/1994 | Graef et al. | 414/788.9 |

FOREIGN PATENT DOCUMENTS

| | | |
|---|---|---|
| GB | 2166898 | 5/1986 |

* cited by examiner

*Primary Examiner*—Karl D. Frech
*Assistant Examiner*—April A. Nowlin
(74) *Attorney, Agent, or Firm*—Francis L. Conte

(57) ABSTRACT

An image forming apparatus uses a plurality of image forming units that are arranged rotatable in a vertical plane such that the image forming units that shifted sequentially to an image forming position. Each image forming unit has a translucent toner detection window on its outer periphery for detecting the remaining amount of toner in a toner hopper. The image forming units will have a replacing position in which it will face an opening for allowing replacement of the image forming unit. The translucent detection window will face the opening when the image forming unit is in the replacing position.

24 Claims, 12 Drawing Sheets

FIG. 4
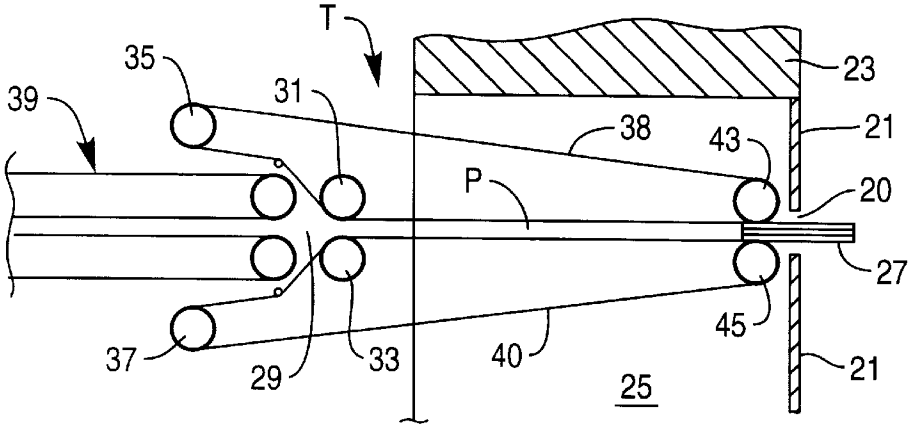
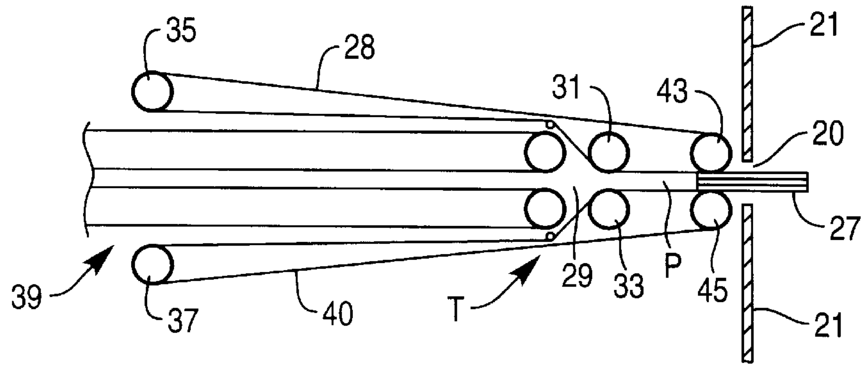
FIG. 5
FIG. 6
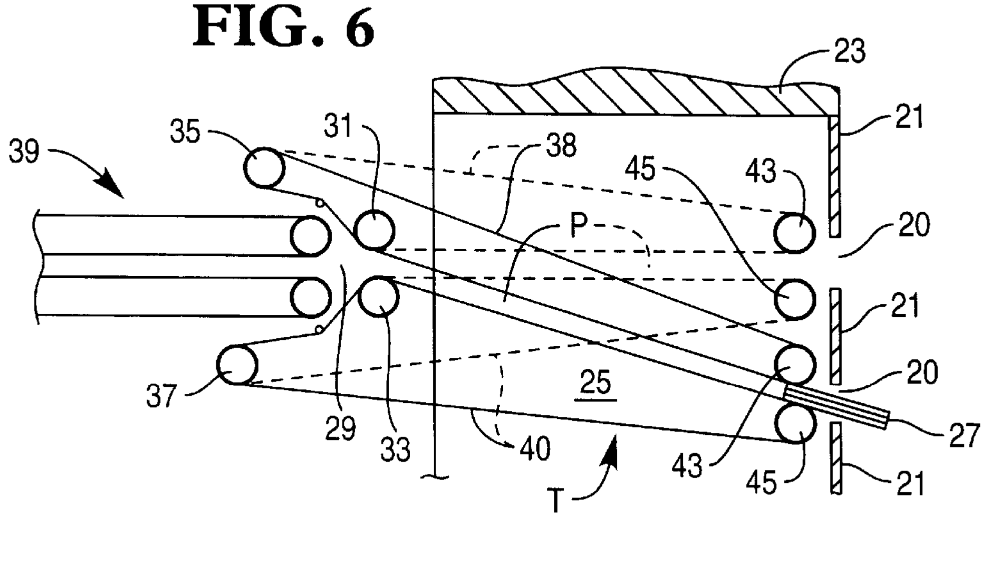

MACHINE FOR DISPENSING MEDIA

This is a continuation-in-part of application Ser. No. 09/114,087 filed Jul. 10, 1998, now abandoned.

BACKGROUND OF THE INVENTION

This invention relates to a machine for dispensing media, for example, a self service terminal (SST), which may be an automated teller machine (ATM).

ATMs are known and possess function controls to dispense cash, accept cash, accept cheques, issue receipts and issue bank statements as well as accept bills for payment. Other SSTs fulfill similar functions but do not deal with cash; an SST may dispense tickets or maps or prepaid cards such as telephone cards. Throughout this specification, the term media is used to include hard copies of printed information resulting from fulfillment of the functions stated for an ATM and an SST as well as cash in the form of bank notes. SSTs and ATMs may be operated by means of a card carrying data, for example magnetic data on the card or data on a semiconductor chip-bearing "Smart Card", for identifying the user and authorizing his use. Alternatively, such machines may employ some other user identification and authorization means, such as a biometric means.

Generally speaking, in addition to necessary electronic circuitry and computer processor controls, an ATM comprises a user interface, a cash delivery slot and a presenter module, which includes a transport mechanism or media transporter for presenting media. The user interface may comprise a card input slot or other user identification means, a display screen and a keyboard pad. In operation, the transport mechanism transfers media from a processor within the ATM to an exit or presentation slot for a customer to remove. For security purposes, external access to the exit slot is usually prevented by at least one shutter which is normally closed and is only opened when media is transported to the exit slot for removal by a customer.

SSTs (including ATMs) are commonly situated behind a wall, the wall having an appropriate hole through which media is transported and dispensed (so-called "through the wall" installations). Walls for such purpose may be external or internal and may be of a thickness varying from a few millimetres to half a metre or more. SSTs are also often free standing for presenting media directly to the customer (so-called "interior/lobby" installations) without the need to transport the media through a wall. Thus, different installations may result in different distances between the position at which media is dispensed from the processor within the SST ("the media dispensing point") and the position at which media is presented to the customer ("the media presentation point"). Until now, different transport mechanisms which are suitable for different installations have had to be developed and tested.

SUMMARY OF THE INVENTION

It is an object to produce a machine for dispensing media, such as an ATM or an SST, having a media transporter which can be used in different types of installation.

According to the present invention there is provided a machine for dispensing media comprising a user interface means and a media transporter for transporting media from a media dispensing point along a media path to a media presentation point, characterized in that the media transporter comprises a variable length belt feed means which is adjustable between a first retracted position in which the media presentation point is adjacent the media dispensing point and a second protracted position in which the media presentation point is displaced from the media dispensing point.

By providing a variable length belt feed means, the media transporter can be adjusted to suit interior/lobby installations, where the media presentation point may be adjacent the media dispensing point, as well as through the wall installations, where the media is required to be transported through different wall thickness.

Preferably, the belt feed means comprises at least one endless feed belt supported on a carriage so as to define the media path, whereby movement of the carriage away from the media dispensing point causes an increase in the length of media path while the overall length of path of the feed belt remains constant.

By use of an endless feed belt supported in this manner, tension in the feed belt is automatically maintained upon adjustment without the need for a separate belt tensioning mechanism.

According to one form of the invention, the media is transported along the media path between two endless feed belts, which form a pinch region therebetween for gripping and transporting media from the media dispensing point to the media presentation point.

One of the feed belts may be resiliently moveable away from the other feed belt against the force of a biasing means to enable the media transporter to transport both a single sheet of media and a stack of media along the media path.

According to one embodiment of the invention, the variable length belt feed means moves from its retracted position to its protracted position when the media transporter is required to transport media. Preferably, there is provided a media presentation slot through which the belt feed means extends when in its protracted position.

By moving the belt feed means to its protracted position only when required to transport media, the belt feed means is kept safely away from the media presentation slot at all times when not in use, so reducing the opportunity for unwarranted fraudulent or vandalistic access to the belt feed means.

Furthermore, when operating currently available ATMs, media protrudes from the presentation slot a maximum presentation length of 18 mm and, whereas persons without handling disabilities are able to grasp such a protrusion, persons with handling disabilities, such as arthritis, may not be able to do so. Consequently, in certain countries, notably Australia and USA, manufacturers of ATMs and other machines for dispensing media, are required to conform to strict design guidelines and legislation necessitating media to protrude from the exit slot a distance of the order of 30 mm. By extending the belt feed means through the media presentation slot in accordance with this embodiment, the presenter module may present media a greater distance from the presentation slot than is possible with currently available machines. In this way, customers suffering from handling disabilities are more easily able to remove media from a machine.

A machine in accordance with this embodiment is preferably fitted with a shutter for opening and closing the media presentation slot and means for opening the shutter upon movement of belt feed means from its retracted position to its protracted position.

In this way, the shutter, which normally closes the media dispensing slot for security purposes, is opened at a time determined by the necessity to dispense media.

Conveniently, the belt feed means is mounted for angular movement about the media dispensing point to enable the media presentation point to be positioned at a variable angular displacement from the media dispensing point.

By mounting the belt feed means for angular movement about the media dispensing point, the presenter module may be adjusted to transport media to a media presentation point which may be higher or lower than the media dispensing point, to suit the particular installation. Furthermore, such an arrangement would allow the possibility of producing an SST having a media presentation point or even a complete fascia which is adjustable in height, or which is pivotable, to allow operation of the machine at a comfortable height or angle for all users, tall and short alike.

BRIEF DESCRIPTION OF THE DRAWINGS

Transport mechanisms designed for use with an ATM in accordance with the present invention will now be described by way of example, with reference to the accompanying drawings in which:

FIG. 4 is a part longitudinal section of the transport mechanism and cash delivery slot of an ATM according to the invention in a through the wall installation;

FIG. 5 is a part longitudinal section similar to FIG. 4 in an interior/lobby installation;

FIG. 6 is a part longitudinal section of a second embodiment of a transport mechanism and cash delivery slot of an ATM according to the invention in a through the wall installation;

DETAILED DESCRIPTION

Throughout the following description, the same reference numbers will be used for the same corresponding parts in the several Figures.

Figure 1:
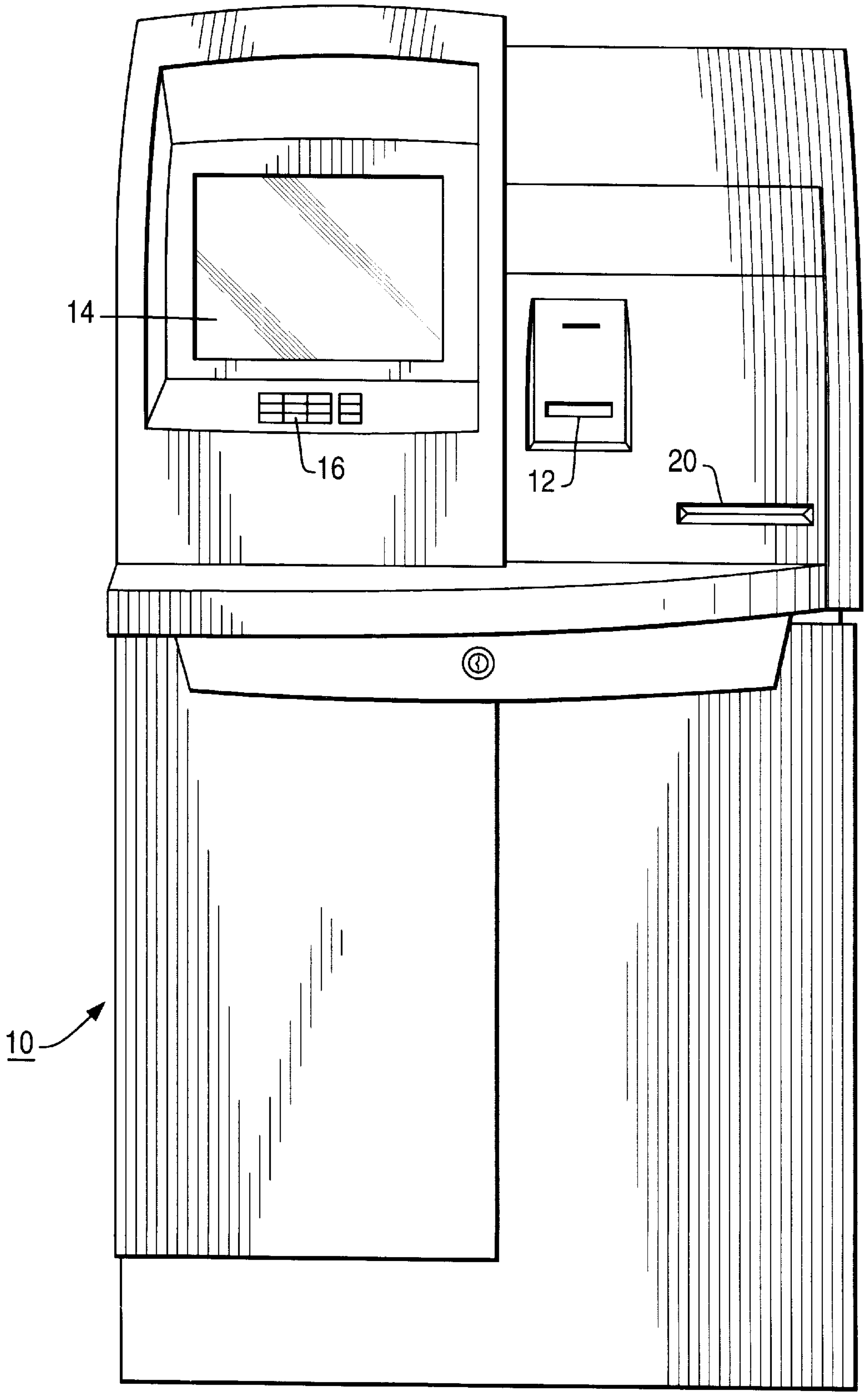
FIG. 1 is a perspective of an ATM having a card reader and a cash dispensing slot.

FIG. 1 shows an ATM 10 having a magnetic card input slot 12, a display screen 14, a keypad 16, and a media presentation or dispensing slot 20 such as a cash delivery slot.

Figure 2:
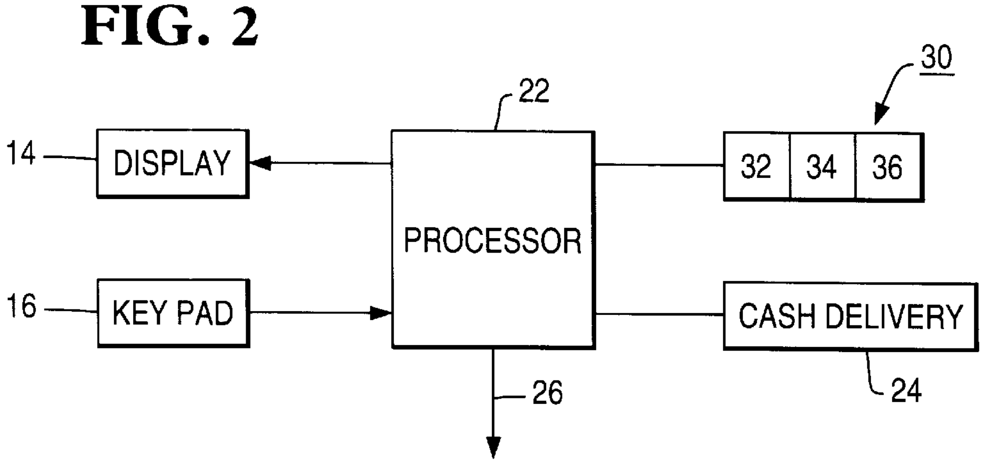
FIG. 2 shows a control system for an ATM.

A control system for the ATM 10 is shown in FIG. 2, in which a processor 22 is connected to receive input from the key pad 16, to control the display 14 and to control a cash counting and delivery system 24 connected to the cash dispensing slot 20. The processor 22 is connected by a connection 26 to a central authorization system of the financial institution operating ATM 10.

A card reader 30 is also connected to the processor 22, the card reader 30 having a standard data head 32, a standard mechanical drive 34 to drive a card into and out of the reader 30, and a card damage detector 36.

Figure 3:
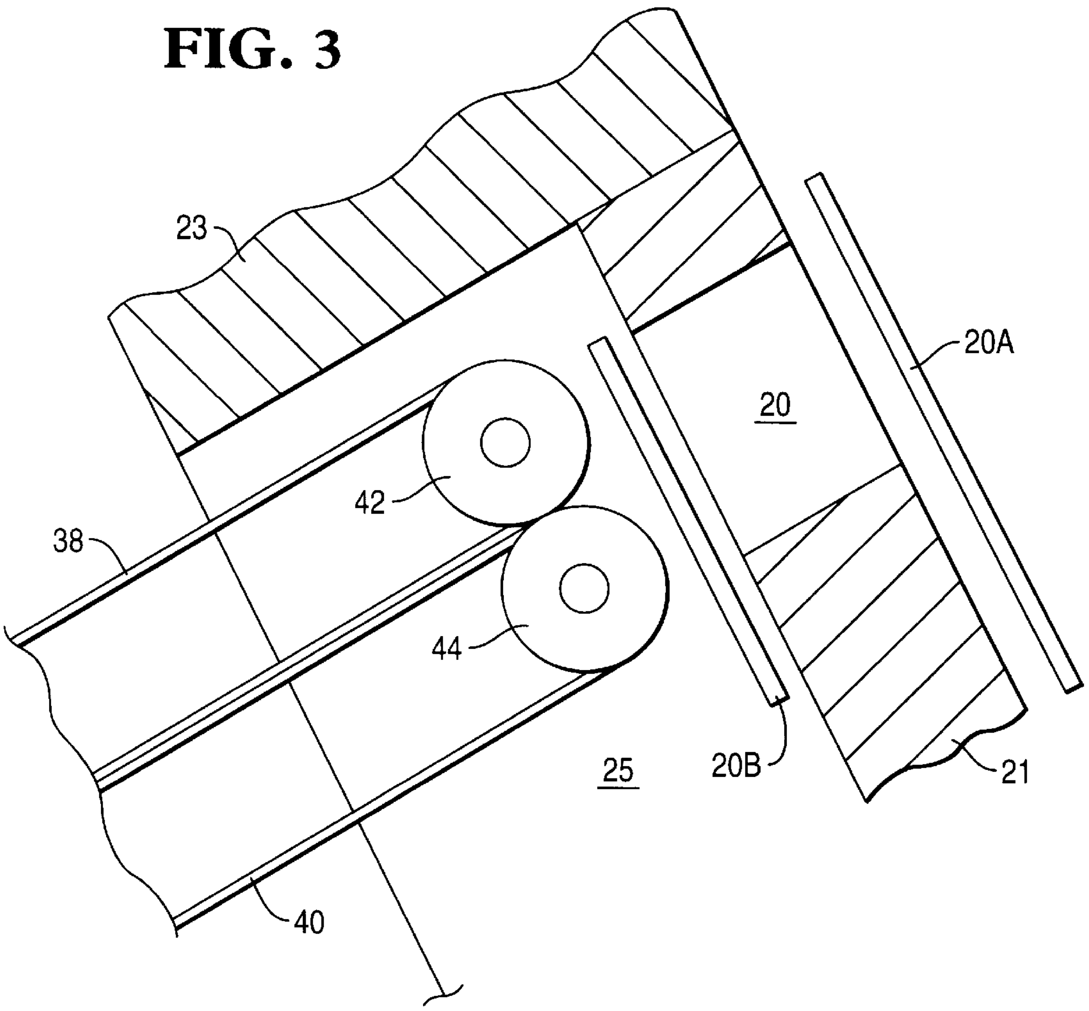
FIG. 3 is a part longitudinal section of a previously proposed transport mechanism for an ATM in a through the wall installation.

FIG. 3 shows part of the presenter module and cash delivery slot of a conventional ATM 10 in a through the wall installation. The cash delivery slot 20 is formed at a suitable position in a fascia wall 21 which is mounted flush with the exterior side of an external wall 23 to form a closure to a hole 25 therein. The cash delivery slot 20 is opened and closed by two shutters, namely, a fascia shutter 20A and an inner shutter 20B. The shutters 20A and 20B are mounted in known manner for covering and uncovering the media dispensing slot 20 in accordance with instructions received from the processor 22 and in response to a signal received from a sensor, not shown. The wall 23 is of standard construction and has a thickness of the order of 33cm. The transport mechanism comprises two endless feed belts 38 and 40 supported on upper and lower pulleys 42 and 44 respectively, the feed belts forming a pinch region between themselves for gripping and transporting cash from a position at which cash is processed and dispensed within the ATM (not shown), through the hole 25 to the cash delivery slot 20.

The transport mechanism of FIG. 3 is designed specifically for a through the wall installation, where the wall 23 is of the specified thickness and the cash delivery slot 20 is at a suitable height. It would be wholly unsuitable for installations where the wall thickness is greater or less since this would result in the transport mechanism either stopping short of the cash delivery slot 20 or extending through the fascia wall 21. For this reason, installations having different wall thicknesses require different transport mechanisms.

In order to overcome the expense of designing, manufacturing, testing and installing a whole range of different transport mechanisms for different installations, the present inventors have invented an adjustable transport mechanism which may be used in many different installations having different wall thicknesses. One embodiment may be used in installations having different exit slot heights, and even presents the possibility of providing SSTs having fully adjustable fascia heights or angles.

A machine according to the invention is shown in FIGS. 4 and 5. FIG. 4 shows the transport mechanism T and cash delivery slot 20 of an ATM according to the invention in a through the wall installation. As in FIG. 3, the cash delivery slot 20 is formed at a suitable position in the fascia wall 21 which forms a closure to hole 25 in wall 23. No shutters are shown in FIG. 4, though clearly shutters could be fitted. The wall 23 is of standard construction and has a thickness of the order of 33 cm. The transport mechanism T comprises upper and lower endless feed belts 38 and 40 each supported on two respective series of pulleys 31,35,43 and 33,37,45. The pulleys comprise two pairs 31/33 and 43/45, a pinch region being formed between the feed belts supported on the pulleys of each pair, and two belt take-up pulleys 35 and 37. A media path P is defined by the pinch region between the feed belts supported between the two pairs of pulleys 31/33 and 43/45.

The first pair of the pulleys 31 and 33 are fixed at a position 29, at which cash is dispensed after processing within the ATM. The second pair of pulleys 43 and 45 are mounted on a carriage (not shown) which is reciprocally moveable backwards or forwards (left or right as viewed in FIGS. 4 and 5) between a first retracted position in which the pulleys 43 and 45 are adjacent the fixed pulleys 31 and 33 and a second protracted position in which the pulleys 43 and 45 are displaced from the fixed pulleys by a predetermined distance depending on the maximum wall thickness that an ATM is envisaged to be installed behind. As shown in FIG. 4, pulleys 43 and 45 are displaced from the fixed pulleys 31 and 33 and are located into position behind the cash delivery slot 20 in fascia wall 21, such that the media path P substantially spans the thickness of the wall 23. The belt take up pulleys 35 and 37 are mounted on the same carriage as pulleys 43 and 45 at a position suitable to take up any slack in the feed belts 38 and 40. As the belt take up pulleys 35 and 37 are mounted on the same carriage, no matter what position the carriage is in, the length of path of the feed belts always remains the same, and hence tension in the feed belts remains constant. A further feed mechanism 39 dispenses cash to the position 29 after it has been processed by the ATM.

When required to deliver cash, the ATM processes the required amount and dispenses the cash to position 29 by means of feed mechanism 39. At position 29 the cash is fed to the pinch region between the feed belts supported between pulleys 31 and 33 of the transport mechanism. The transport mechanism is then actuated by means of a sensor (not shown) and the feed belts 38 and 40 are driven around the pulleys in a direction to transport the cash along the media path P from position 29, through the hole 25 in wall 23 to a position at which the cash 27 is presented to the user through the cash delivery slot 20 as shown, at which point the transport mechanism is stopped by means of another sensor (not shown).

FIG. 5 shows the same transport mechanism of an ATM according to the invention but this time in an interior/lobby installation, where there is no wall 23 and the cash delivery slot 20 is close to the position 29 at which cash is dispensed by the feed mechanism 39 after processing within the ATM. In this case, the carriage on which pulleys 43 and 45 are mounted is in a retracted position in which pulleys 43 and 45 are located adjacent the fixed pulleys 31 and 33 and behind the cash delivery slot 20 in fascia wall 21. As the belt take up pulleys 35 and 37 are mounted on the same carriage, they are also in a retracted position, and the tension in the feed belts remains constant.

It will be appreciated that the transport mechanism described with reference to FIGS. 4 and 5 may be used for interior/lobby installations (as in FIG. 5) or through the wall installations (as in FIG. 4) where the wall is of anything up to the predetermined thickness described above. Furthermore, as an alternative construction, instead of being mounted on the same carriage as pulleys 43 and 45, the belt take up pulleys 35 and 37 may be mounted on a linkage connected to the carriage, to enable the take up pulleys to be moveable in a different direction to the carriage, depending on the space available in a particular installation, while still performing the function of maintaining constant tension in the feed belts.

FIG. 6 shows a transport mechanism of an ATM similar to that shown in FIGS. 4 and 5, but with the further modification of the carriage, on which pulleys 35, 37, 43 and 45 are mounted, being tiltable about a pivot point located at position 29. Thus, not only may the pulleys 43 and 45 be displaced away from the fixed pulleys 31 and 33 and located into position behind the cash delivery slot 20 in fascia wall 21 as described above and as depicted by the dotted lines in FIG. 6, but by angular movement of the carriage about its pivot point, the pulleys 43 and 45 may also be moved up or down so as to locate behind a cash delivery slot 20 which is higher or lower (as is the case depicted by solid lines in FIG. 6).

It will be clear to persons skilled in the art that the transport mechanism described with reference to FIG. 6 also presents the possibility of providing an ATM having a fascia which is adjustable in height or angle within the limits of movement governed by the carriage.

Figure 7:
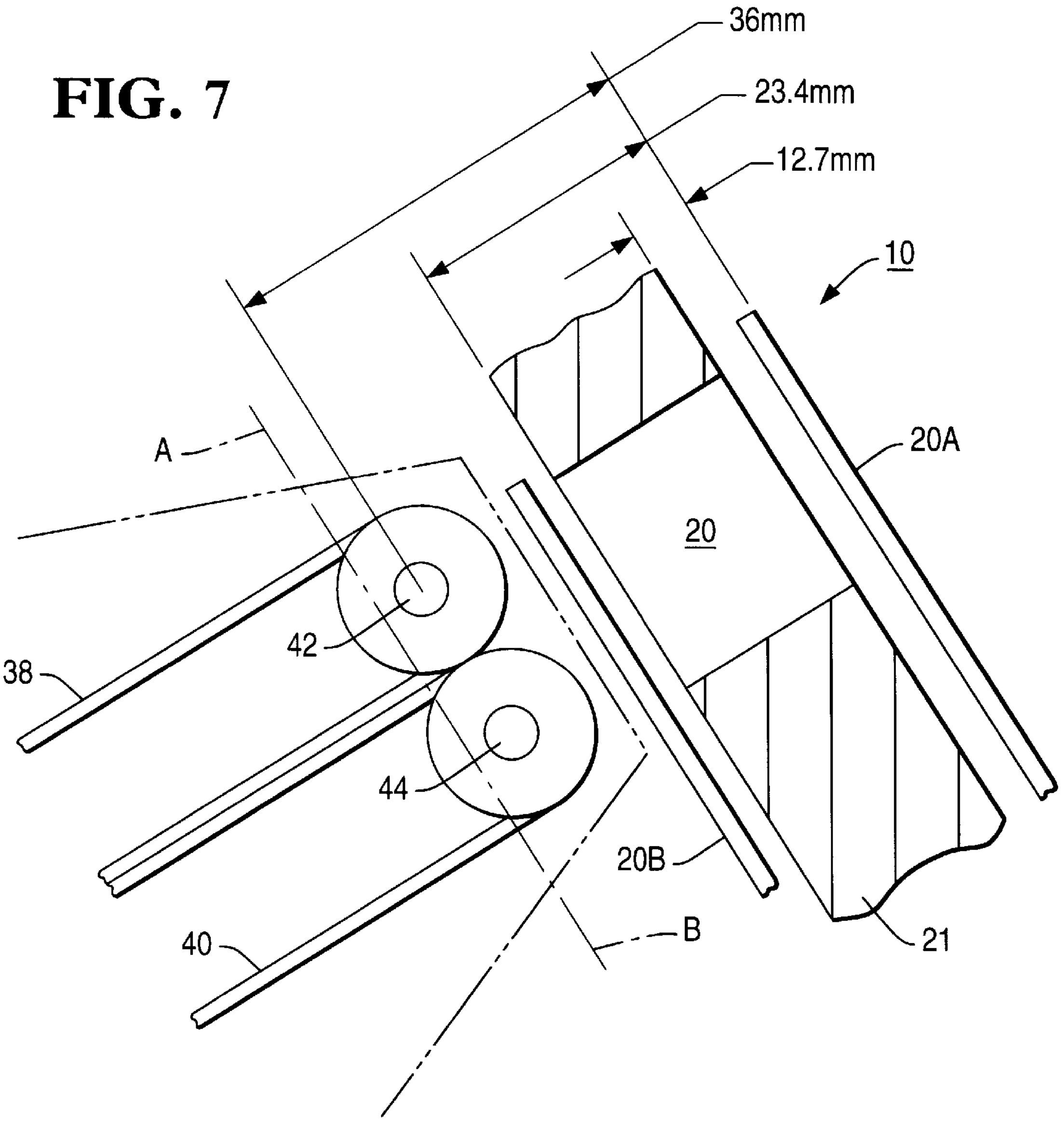
FIG. 7 is a part longitudinal section of a previously proposed transport mechanism for an ATM included for comparative purposes.

FIG. 7 shows the business and delivery end of another previously proposed transport mechanism installed in an ATM 10. As described above with reference to FIG. 3, the dispensing slot 20 is formed in a safe wall 21 and is opened and closed by a fascia shutter 20A and an inner shutter 20B. The shutters 20A and 20B are mounted in known manner for covering and uncovering the media dispensing slot 20 in accordance with instructions received from the processor 22 and in response to a signal received from a sensor, not shown. The sensor has a center line AB positioned to sense a leading edge of the media to be dispensed between a pinch point of upper 38 and lower 40 transporter belts supported on upper 42 and lower 44 pulleys.

Generally speaking small banknotes dispensed long-edge leading by the ATM 10 of FIG. 7 have a minimum width of 54 mm. The wall thickness of the safe conventionally provided in an ATM is about 12.7 mm, and the cash delivery slot is protected by shutters 20A and 20 B, so that having regard to the dimensions given in FIG. 7, the media will protrude a maximum distance of 54−36=18 mm, from the fascia shutter 20A. In the introductory part of this specification reference was made to certain countries, notably Australia and USA, establishing guidelines necessitating an increase in the minimum presentational projection of media to assist disabled persons to operate ATMs. FIG. 7 also indicates the safe wall having a thickness 10.7 mm and the distance from the internal face of the safe wall to the outer face of the fascia shutter 20A to be 23.4 mm.

To meet the requirements of those guidelines, a transport mechanism according to the invention including a retractable carriage which is displaceable may present media a distance of the order of 30 mm or more from the fascia shutter 20A. Such a transport mechanism including a retractable carriage is shown in FIGS. 8 to 15.

Figure 8:
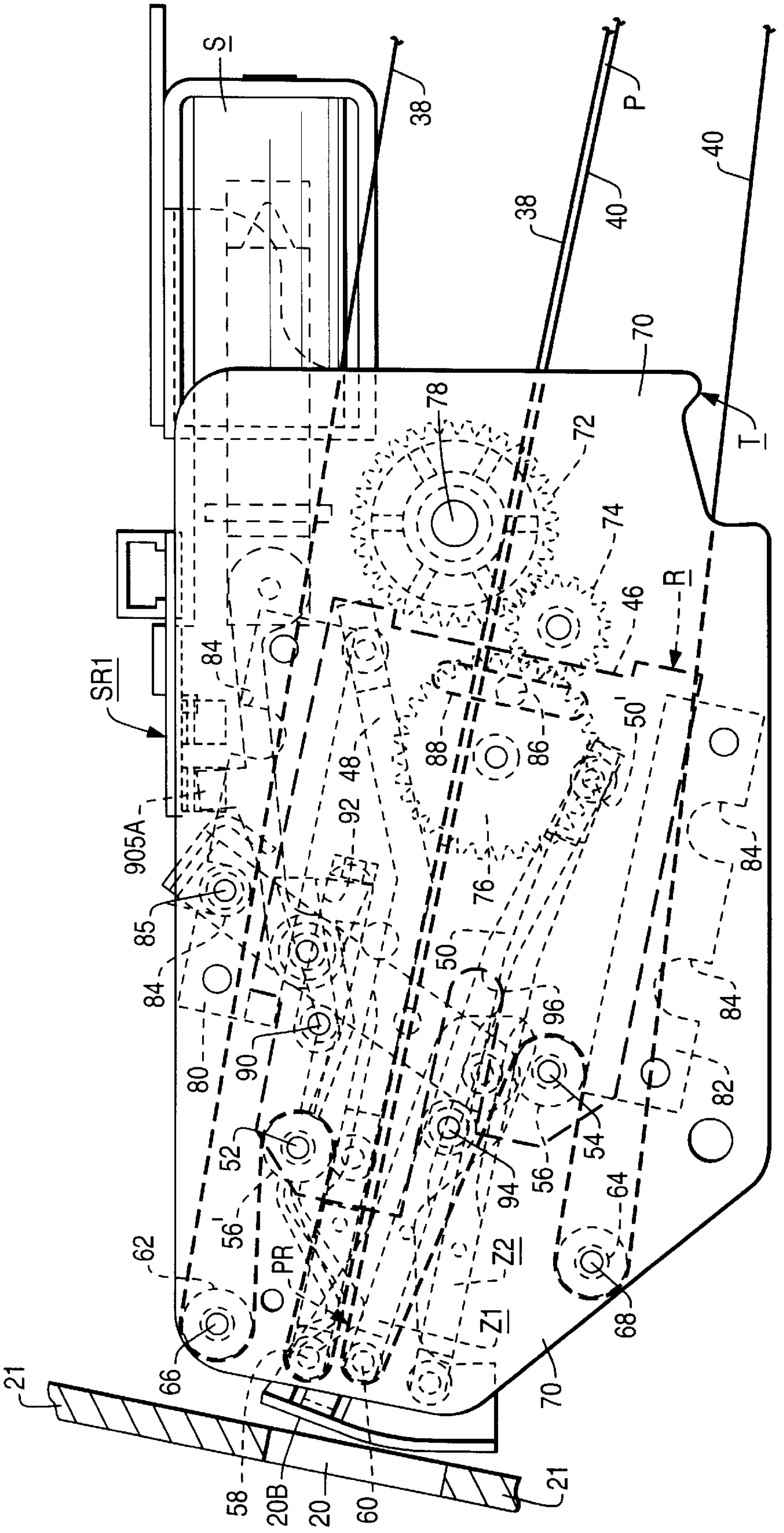
FIG. 8 is a part longitudinal section of a third embodiment of the transport mechanism showing a retractable carriage in a retracted position.

Referring to FIG. 8 a transport mechanism T has a retractable carriage R shown in a retracted non-media presentation position with an angularly displaceable shutter 20B in a closed position. The retractable carriage R has two identical chassis side plates 46 (see also FIGS. 9, 10 and 11) disposed with running clearance outboard of each longitudinal edge of upper and lower continuous belts 38 and 40 respectively. The chassis side plates 46 are maintained in spaced parallel relationship by upper 48 and lower 50 belt guides (see also FIGS. 10 and 11) as well as roller shafts 52 and 54 on which rollers 56,56' are mounted and over which the belts 38 and 40 are passed as shown in FIGS. 8 and 9.

The upper belt guide 48 is fixed between the chassis side plates 46 whereas the lower belt guide 50 is angularly displaceable about axle 50', see FIGS. 8, 9, 10 and 11. In order to maintain a nip between upper and lower belts 38 and 40 passing over rollers 58 and 60 during dispensation of media, a torsion spring 50TS, see FIGS. 10 and 11, supported on axle 50' biases the lower belt guide 50 clockwise as viewed in FIGS. 8, 9 and 11. Angular displacement of the lower belt guide 50 permits media having a minimum thickness of 0.1 mm and a stack of media up to a maximum thickness of 10.0 mm to be dispensed. The positions of the lower guide belt 50 for dispensing minimum and maximum amounts of media are shown at Z1 and Z2 respectively in FIGS. 8 and 9.

As shown in FIGS. 8, 9, 14 and 15, the upper 38 and lower 40 belts (omitted for clarity in FIGS. 14, 15), are additionally supported on upper 62 and lower 64 rollers which, in turn are supported on axles 66 and 68 respectively. The axles 66/68 respectively act as spacers for two side panels 70 of the transport mechanism T.

Figure 9:
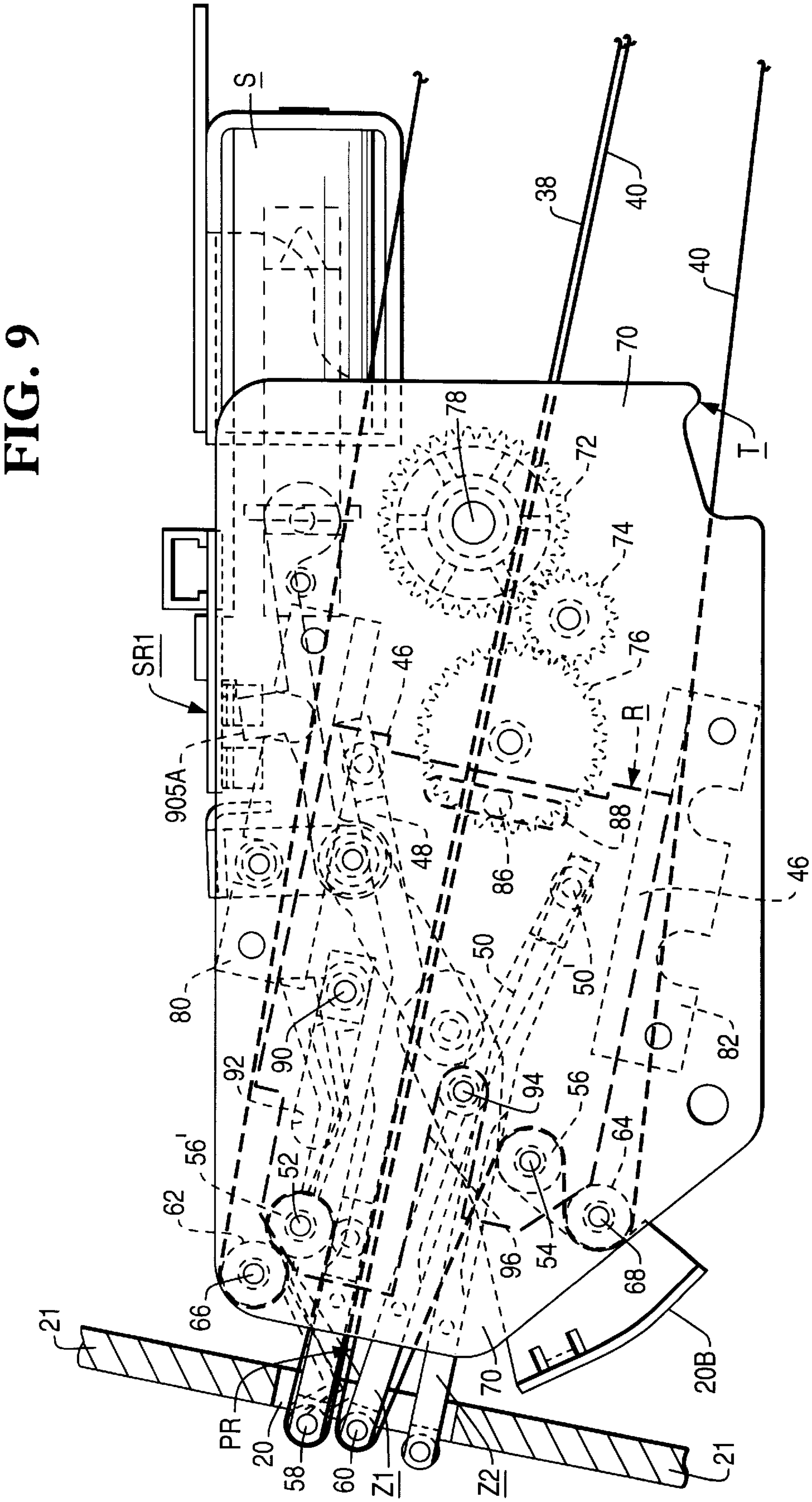
FIG. 9 is a part longitudinal section similar to FIG. 8 with the retractable carriage in a media present position.

The retractable carriage R is reciprocally movable between the retracted position of FIG. 8 and the media present position of FIG. 9 by means of a stepper motor, not shown, which drives two trains of three gears 72, 74 and 76—see FIGS. 8, 9, 14 and 15. Each gear train is supported as shown in the side panels 70 (see particularly FIGS. 14 and 15) and the two gears 72 which are driving gears, are mounted on a common driving shaft 78. Three rollers 78A are also mounted on the driving shaft 78 and these rollers support the travel path of the upper belt 38 as shown in FIGS. 8 and 9. During reciprocal movements, the retractable carriage R slides between pairs of upper 80 and lower 82 guides carried by the side plates 70 of the transport mechanism T. The upper 80 and lower 82 guides each have two U-shaped cut-outs 84 (shown dotted in FIGS. 8 and 9 and in full lines in FIG. 15) for receiving a roller 85—see FIGS. 14 and 15—of a shutter linkage mechanism to be described later.

Figure 10:
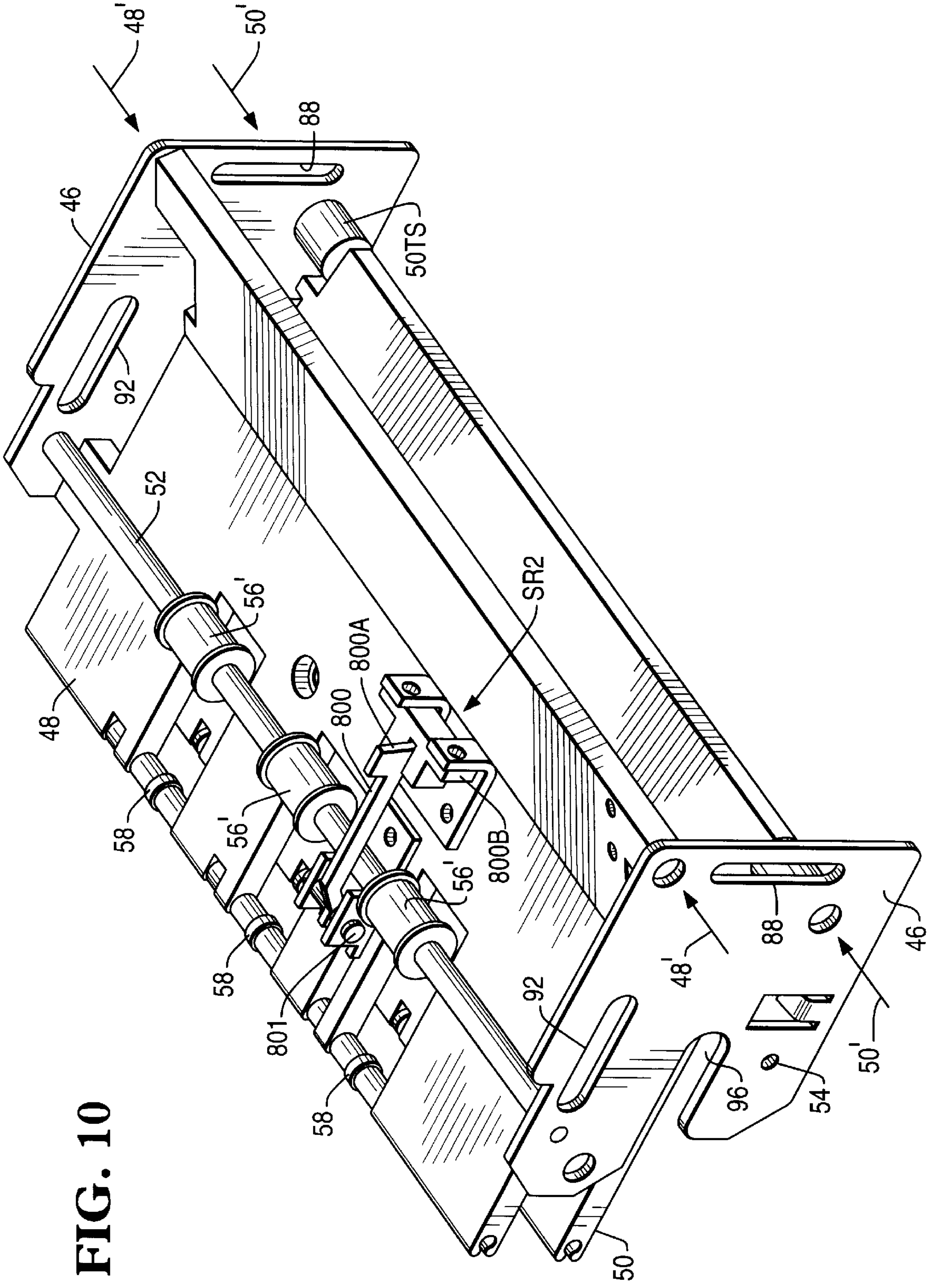
FIG. 10 is a perspective from above, considered with respect to FIGS. 8 and 9, of the retractable carriage removed from the transport mechanism.
Figure 11:
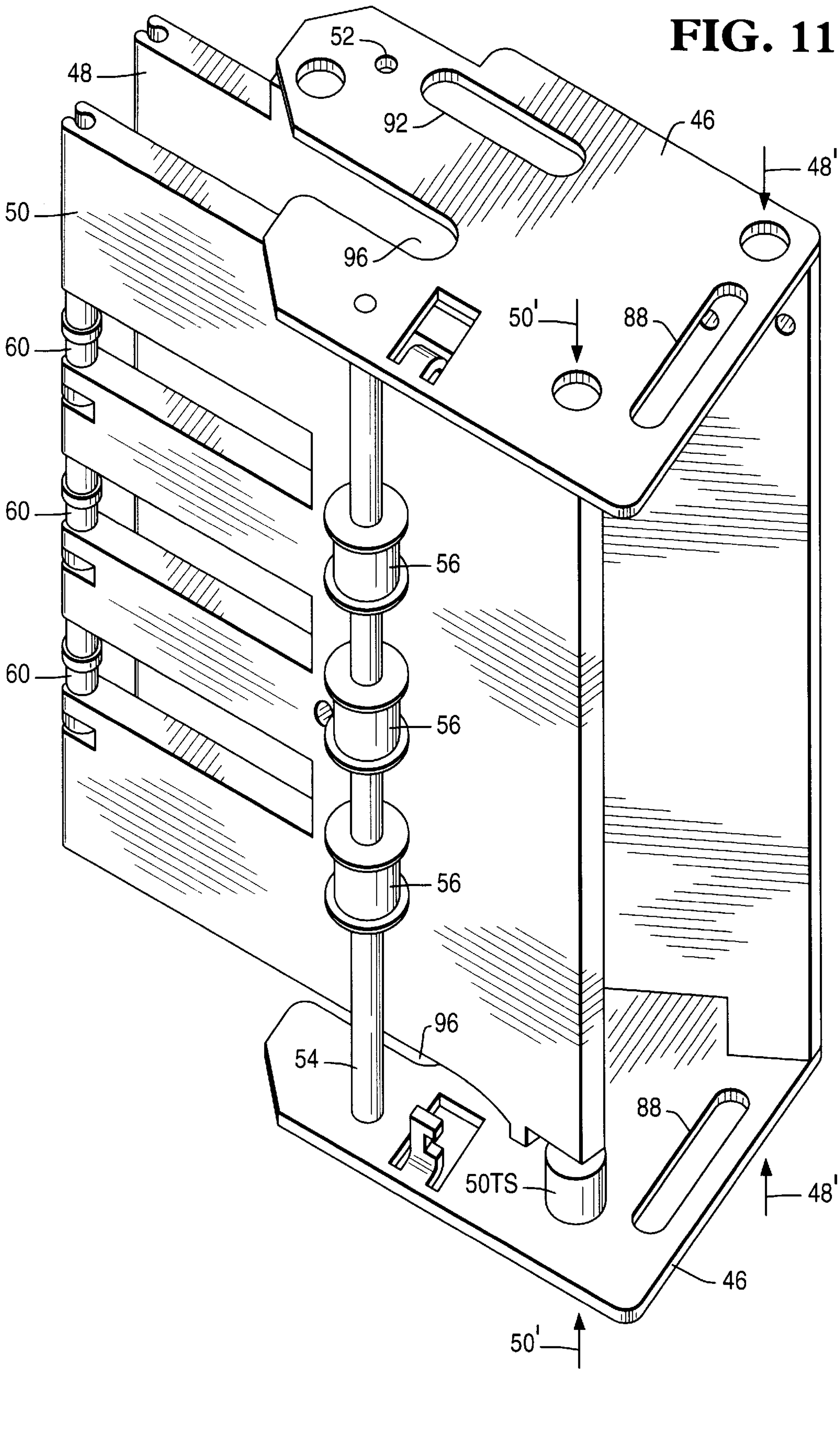
FIG. 11 is a perspective from below, considered with respect to FIGS. 8 and 9, of the retractable carriage removed from the transport mechanism.
Figure 12:
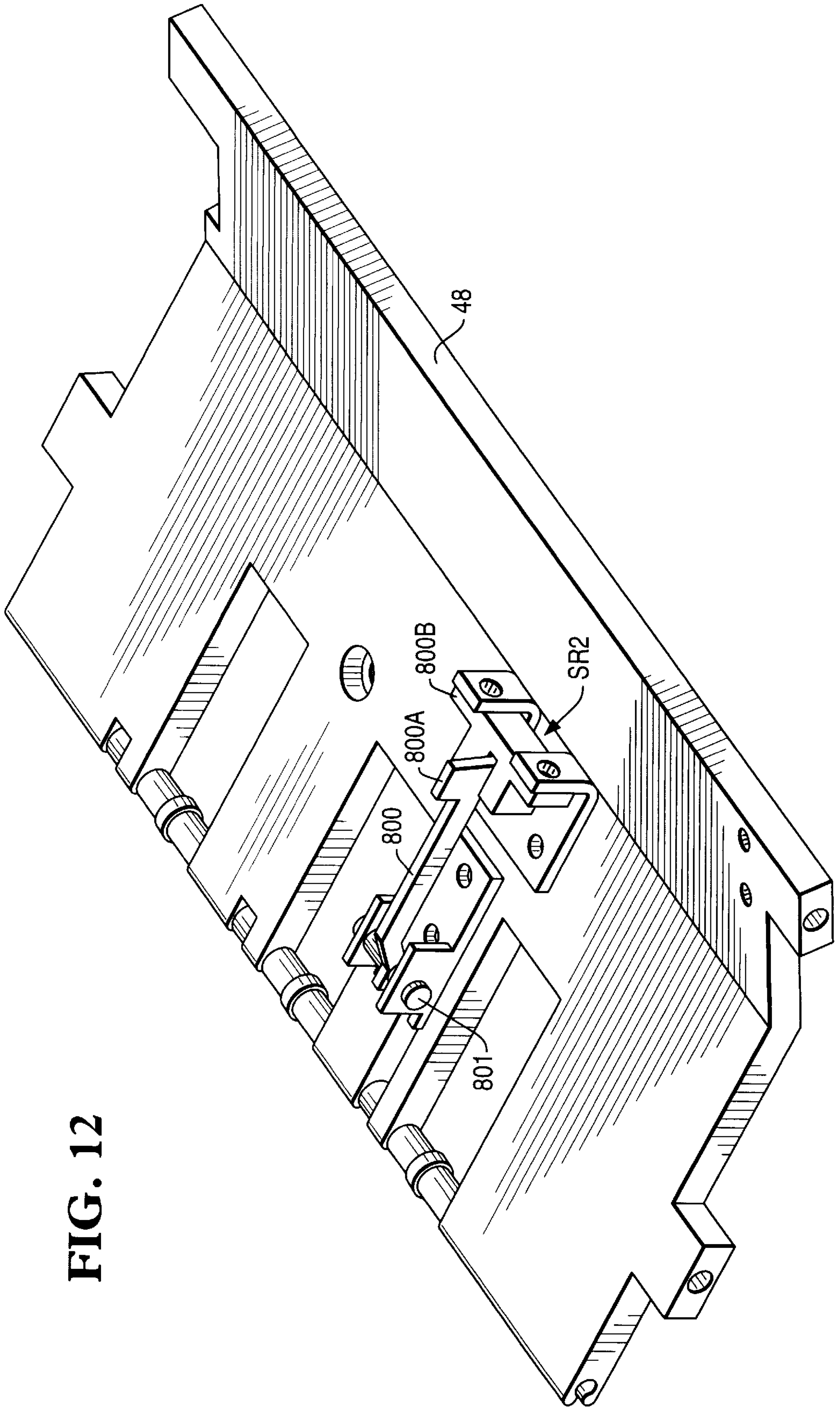
FIG. 12 is a perspective of a top guide of the retractable carriage of FIGS. 8 and 9.

The amount of reciprocal movement of the retractable carriage R is governed by:

I. a pin 86 (see FIGS. 8, 9 and 15) fixed to each gear 76 of the two gear trains 72, 74, 76 and movable within slots 88 formed in each chassis plate 46 of the retractable carriage R—see also FIGS. 10 and 11;

II. a pin 90 (see FIGS. 8, 9 and 15) fixed to each side plate 70 of the transport mechanism T acts as a guide within a slot 92 (see also FIGS. 10 and 11) cut in each chassis side plate 46, the longitudinal sides of the slots 92 serve to guide reciprocal movements of the retractable carriage R and the ends of the slots 92 determine the extent of reciprocal movement of the carriage R, and III. a pin 94 (see FIGS. 8, 9 and 15) fixed to each side plate 70 of the transport mechanism T acts as a guide within an open-ended slot 96 formed in each chassis plate 46. The open ended slots 96 are shown in dotted lines in FIGS. 8 and 9 and in full lines in FIGS. 10 and 11.

During forward movement of the retractable carriage R from the position shown in FIG. 8 to that shown in FIG. 9 to present media to a user through the dispensing slot 20, the upper and lower belts 38/40 effectively unwrap from appropriate series of pulleys (58, 56', 62) and (60, 56, 64) thus maintaining constant tension in and preventing additional stretching of the upper and lower belts 38/40.

During movement of the retractable carriage R from the position shown in FIG. 8 to that shown in FIG. 9, the shutter 20B is angularly displaced to permit presentation of media through the media dispensing slot 20. Angular displacement of the shutter 20B is effected via two multi-link linkages driven by a ram solenoid 5 and will now be described.

Figure 13:
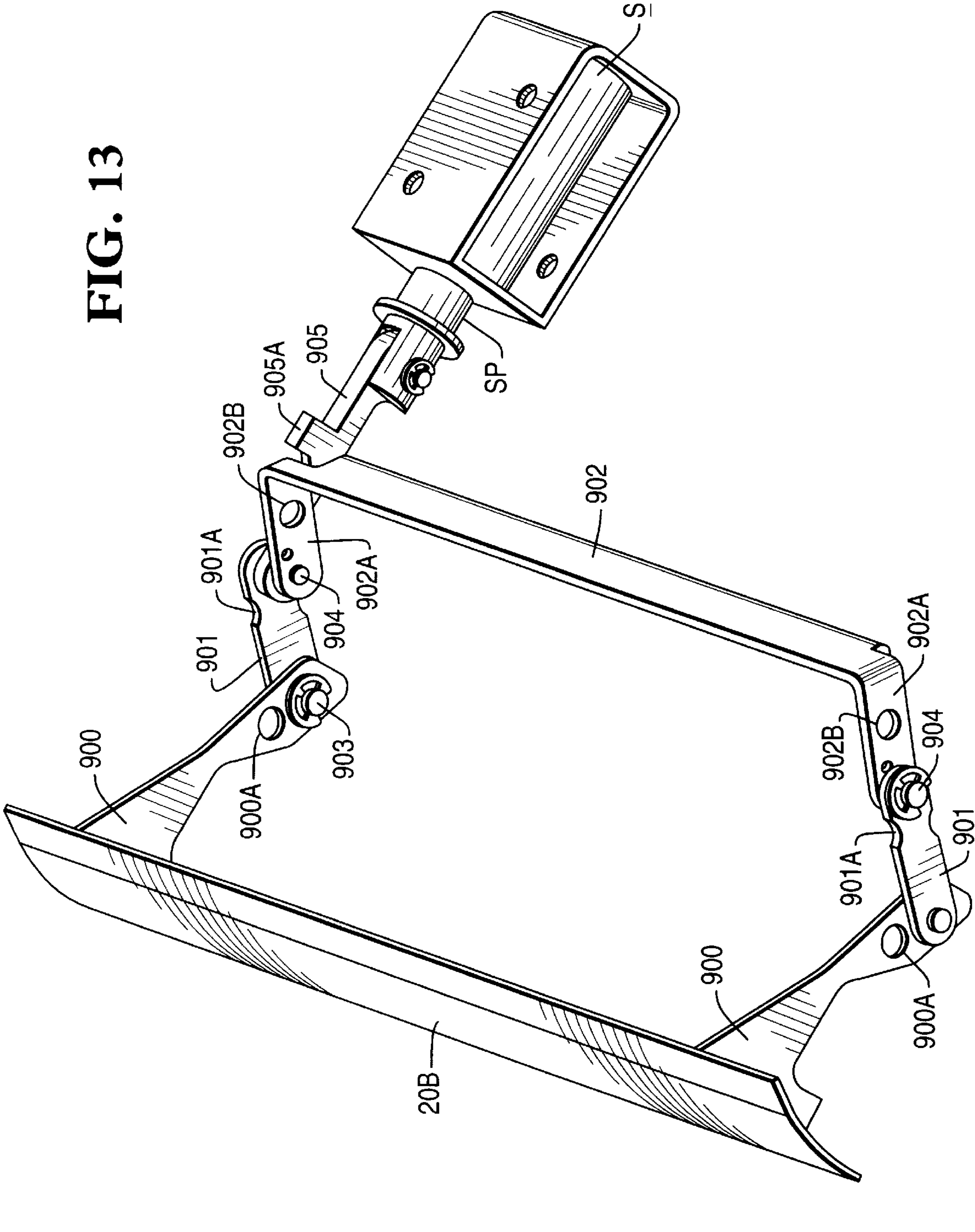
FIG. 13 is a perspective from above of a solenoid operated shutter and linkage of the retractable carriage of FIGS. 8 and 9.
Figure 14:
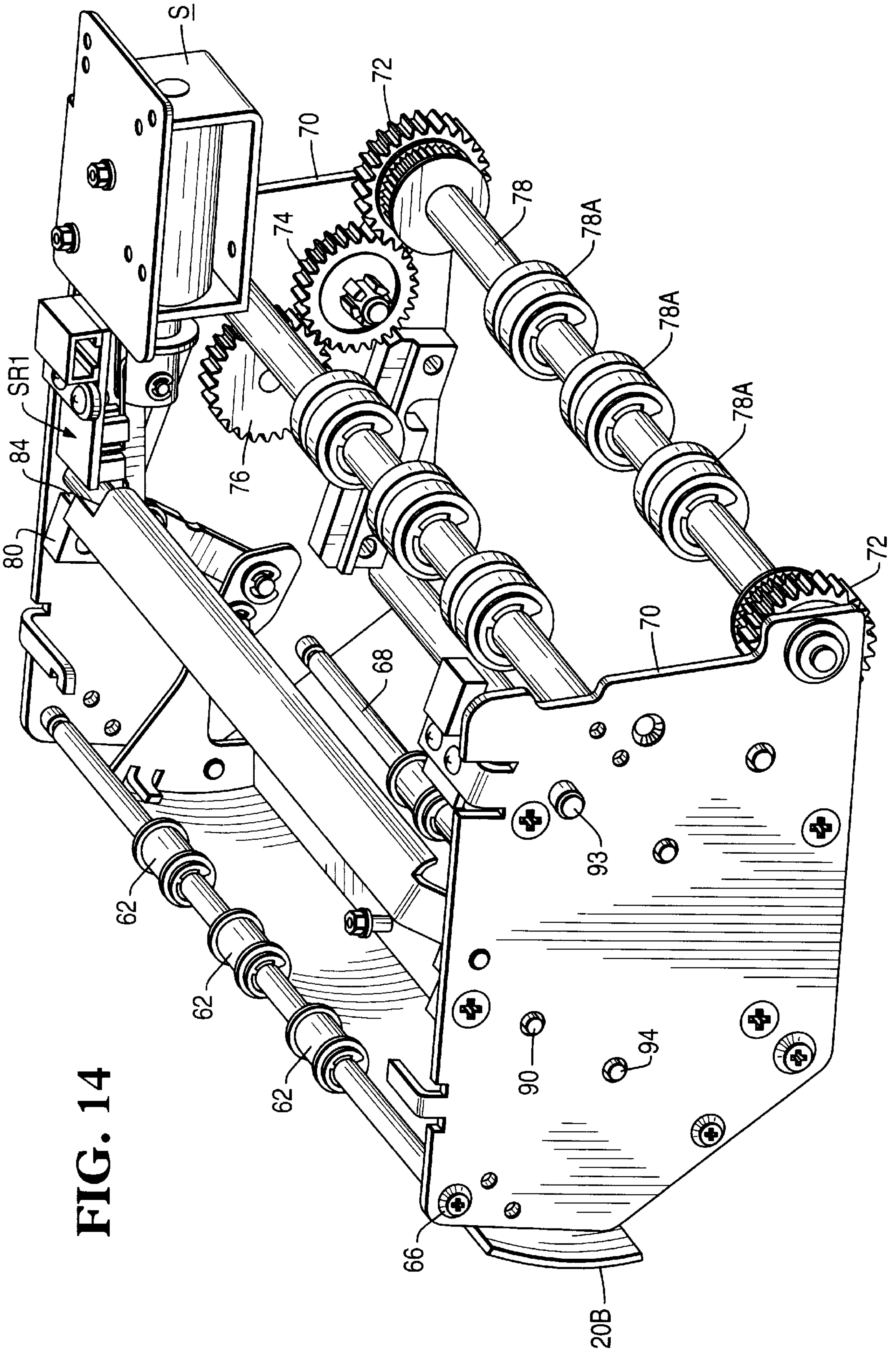
FIG. 14 is a perspective from above of the transport mechanism of FIGS. 8 and 9 with the retractable carriage removed.

FIG. 13 shows the shutter 20B and the multi-link linkages in perspective and, for balanced operation of the shutter 20B, each end position of the shutter is attached to corresponding links of each linkage.

Figure 15:
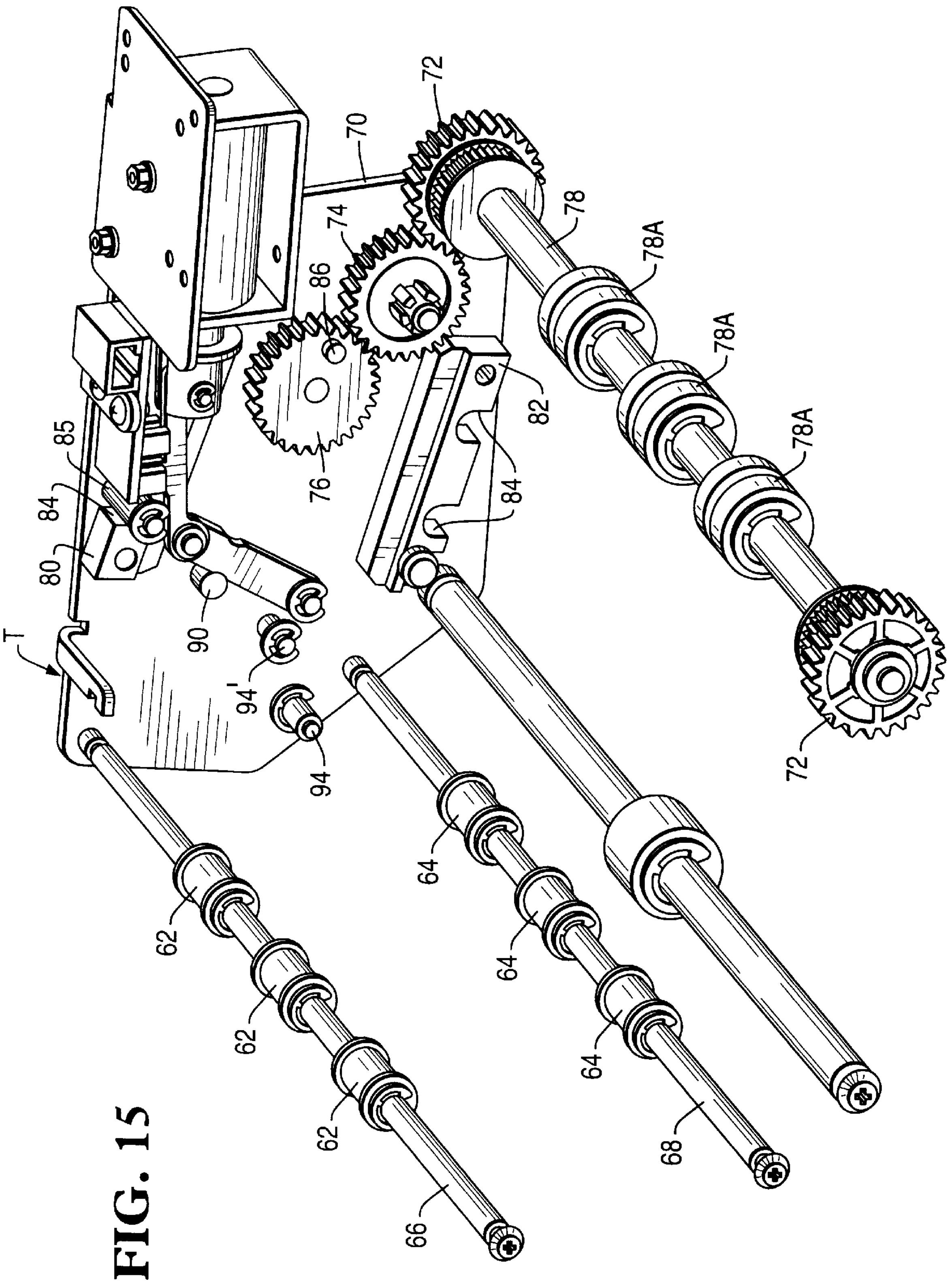
FIG. 15 is a part exploded perspective similar to FIG. 14 with one side frame panel of the transport mechanism removed and showing upper and lower fixed guides which guide movement of the retractable carriage between the positions depicted in FIGS. 8 and 9.

Corresponding links in each linkage are designated by the same reference number. Each linkage has three links 900, 901 and 902 with links 900 attached to the shutter 20B and pivotally connected at 903 to links 901. The link 902 is, as shown, of U-shape with legs 902A pivotally connected at 904 to the links 901. A driving link 905 having a tongue 905A is also pivotally connected to the first 904 as well as to a solenoid plunger SP. Each link 900 has a hole 900A for receiving a pin 94' (see FIG. 15) which acts as a fulcrum for the shutter during movement of the retractable carriage R. Each arm 902A of the link 902 has a hole 902B for mounting on a roller 85 which, as a previously described, is located in a U-shaped cut-out 84 in the upper guide 80. Each link 901 is formed with detents 901A (shown dotted in FIGS. 8 and 9 and in full lines in FIGS. 13, 14 and 15) and, as seen in FIGS. 8 and 15, engages with the pin 90 which acts both as a fulcrum and a stop for the links 901 in the closed position of the shutter 20B.

Operation of each linkage 900, 901 and 902 and, consequently, the shutter 20B is controlled by energization of the solenoid 5 and the position of each linkage is sensed by the sensor SR1 according to whether the tongue 905A is in the position shown in FIG. 8 (shutter closed) or FIG. 9 (shutter open).

Energization of the solenoids is synchronized with the operation of the stepper motor, not shown, which drives the gear trains 72, 74, 76 and, consequently, the retractable carriage from the position shown in FIG. 8 to that of FIG. 9 and vice versa.

In addition to the sensor SR1 which detects, as indicated above, the position of the linkage 900, 901, 902 and the shutter 20B, a second sensor SR2 (see FIG. 12) serves to detect when media has been removed from the ATM 10. The sensor SR2 is carried by the upper guide plate 48 and has a sensor arm 800 which is pivotally mounted on axle 801—see FIG. 12. The sensor arm has a tongue 800A which, on pivotal movement of the sensor arm 800, is positioned either "in" or "out-of" a sensor yoke 800B. FIGS. 8 and 9 show the "in" and "out-of" positions of the sensor tongue 800A in dotted lines as well as the multi-cranked shape of the sensing arm 800, a part-800C of which (see FIGS. 8, 9) senses when media has been removed from the exit slot 20 of the ATM 10.

From the foregoing description of the present invention, it will be appreciated that the carriage R is moved from the position of FIG. 8 to that of FIG. 9 by the stepper motor, not shown, which drives the carriage R through gear trains 72, 74, 76 and pin/slot 86/88 when the shutter 20B is open. The carriage R includes upper and lower media guides 48/50 fitted with pulleys 58 and 60 respectively and two idler shafts 52/54 which are also fitted with pulleys 56' and 56 respectively. The carriage R contains loops of the transport belts 38 and 40 which are wrapped around a series of pulleys as shown in FIGS. 8 and 9. The pulleys 58 and 60 carried by the media guides 48/50 are capable of entering the safe opening 20 while containing a minimum of 0.1 mm thick media document and a maximum stack of 10 mm thick media. When the carriage moves forward from the position of FIG. 8 to that of FIG. 9 the belts 38/40 in effect unwrap from the pulleys 56' and 56 thus maintaining constant tension and reducing additional stretch in the belts 38/40 during carriage movement. The carriage R also contains a sensing device SR2 for detecting when media has been removed, whereafter the carriage R is retracted and the shutter 20B is closed for security.

The invention has been described with reference to an ATM arranged to dispense small banknotes long-edge leading. It may also be applied to an ATM arranged so as to dispense small-size receipts or to an SST arranged to dispense small-size tickets or the like, tickets may be as small as a conventional credit card; or the SST may dispense e.g. prepaid telephone cards or the like, of similar size to a credit card.

What is claimed is:

1. A machine for dispensing media comprising:

user interface means;

a media transporter for transporting media from a media dispensing point along a media path to a media presentation point, the media transporter comprising a variable length belt feed means which is adjustable between a first retracted position in which the media presentation point is adjacent the media dispensing point and a second protracted position in which the media presentation point is displaced from the media dispensing point; and said belt feed means includes at least one endless feed belt mounted in a loop on three rollers offset from each other in a triangular configuration, with two of said rollers having an adjustable spacing therebetween.

2. A machine according to claim 1, wherein some of said rollers are supported on a carriage so as to define the media path, whereby movement of said carriage away from the media dispensing point causes an increase in the length of said media path while the overall length of the feed belt remains constant.

3. A machine according to claim 2, wherein the belt feed means includes two endless feed belts which form a pinch region therebetween for gripping and transporting media from the media dispensing point to the media presentation point.

4. A machine according to claim 3, wherein one of the feed belts is resiliently moveable away from the other feed belt against the force of a biasing means to enable the media transporter to transport both a single sheet of media and a stack of media along the media path.

5. A machine according to claim 1, wherein the variable length belt feed means moves from its retracted position to its protracted position when the media transporter is required to transport media.

6. A machine according to claim 5, further comprising means defining a media presentation slot through which the belt feed means extends when in its protracted position.

7. A machine according to claim 6, further comprising (i) a shutter for opening and closing the media presentation slot, and (ii) means for opening the shutter upon movement of the belt feed means from its retracted position to its protracted position.

8. A machine according to claim 1, wherein the belt feed means is mounted for angular movement about the media dispensing point to enable the media presentation point to be positioned at a variable angular displacement from the media dispensing point.

9. An automated teller machine (ATM) comprising:

a banknote cassette for storing banknotes;

a banknote transporter for transporting banknotes from the banknote cassette along a banknote path between a banknote dispensing point to a banknote presentation point, the banknote transporter comprising a variable length belt feed means which is adjustable between a first retracted position in which the banknote presentation point is adjacent the banknote dispensing point and a second protracted position in which the banknote presentation point is displaced from the banknote dispensing point; and said belt feed means includes at least one endless feed belt mounted in a loop on three rollers offset from each other in a triangular configuration, with two of said rollers having an adjustable spacing therebetween.

10. An ATM according to claim 9, wherein some of said rollers are supported on a carriage so as to define the banknote path, whereby movement of said carriage away from the banknote dispensing point causes an increase in the length of said banknote path while the overall length of the feed belt remains constant.

11. An ATM according to claim 10, wherein the belt feed means includes two endless feed belts which form a pinch region therebetween for gripping and transporting banknotes from the banknote dispensing point to the banknote presentation point.

12. An ATM according to claim 11, wherein one of the feed belts is resiliently moveable away from the other feed belt against the force of a biasing means to enable the banknote transporter to transport both a single banknote and a stack of banknotes along the banknote path.

13. An ATM according to claim 9, wherein the variable length belt feed means moves from its retracted position to its protracted position when the banknote transporter is required to transport banknotes.

14. An ATM according to claim 13, further comprising means defining a banknote presentation slot through which the belt feed means extends when in its protracted position.

15. An ATM according to claim 14, further comprising (i) a shutter for opening and closing the banknote presentation slot, and (ii) means for opening the shutter upon movement of the belt feed means from its retracted position to its protracted position.

16. An ATM according to claim 9, wherein the belt feed means is mounted for angular movement about the banknote dispensing point to enable the banknote presentation point to be positioned at a variable angular displacement from the banknote dispensing point.

17. A method of operating a machine for dispensing media, the method comprising the steps of:

(a) identifying a user;

(b) receiving: an instruction from a user;

(c) preparing media corresponding to the received instruction;

(d) adjusting a variable length belt feed arrangement from a first retracted position in which the belt feed arrangement is behind a media dispensing slot to a second protracted position in which the belt feed arrangement extends through the dispensing slot; and (e) dispensing media through the dispensing slot for removal by a user.

18. A method of operating an automated teller machine (ATM) for dispensing banknotes, the method comprising the steps of:

(a) identifying an ATM customer;

(b) receiving an instruction from an ATM customer;

(c) preparing banknotes corresponding to the received instruction;

(d) adjusting a variable length belt feed arrangement from a first retracted position in which the belt feed arrangement is behind a banknote dispensing slot to a second protracted position in which the belt feed arrangement extends through the banknote dispensing slot; and (e) dispensing banknotes through the banknote dispensing slot for removal by an ATM customer.

19. A media dispenser comprising:

a wall including a slot for dispensing media; and a continuous feed belt mounted in a loop on three rollers offset from each other in a triangular configuration behind said slot for transporting said media therethrough, with two of said rollers having an adjustable spacing therebetween.

20. A dispenser according to claim 19 further comprising two of said feed belts and corresponding rollers arranged as upper and lower feed belts defining a pinch region therebetween for transporting said media through said slot.

21. A dispenser according to claim 20 further comprising:

a carriage slidably mounted in a chassis; and some of said rollers are supported by said carriage, and some of said rollers are supported by said chassis to effect said adjustable spacing between said two rollers as said carriage is moved relative to said chassis.

22. A dispenser according to claim 21 wherein each of said belts is arranged in a serpentine path, with adjacent rollers positioned to rotate in opposite directions.

23. A dispenser according to claim 21 further comprising means for reciprocating said carriage in said chassis for retracting and protracting distal ends of said feed belts at said slot.

24. A dispenser according to claim 23 wherein said reciprocating means are configured for protracting said belt distal ends through said slot.

* * * * *

UNITED STATES PATENT AND TRADEMARK OFFICE

CERTIFICATE OF CORRECTION

PATENT NO. : 6,398,108 B1
DATED : June 4, 2002
INVENTOR(S) : James D. Swinton et al.

It is certified that error appears in the above-identified patent and that said Letters Patent is hereby corrected as shown below:

<u>Column 10,</u>
Line 46, after "receiving" delete ":".

Signed and Sealed this

Sixth Day of August, 2002

*Attest:*

JAMES E. ROGAN

*Attesting Officer* *Director of the United States Patent and Trademark Office*